(12) United States Patent
Ellmann et al.

(10) Patent No.: US 6,587,855 B1
(45) Date of Patent: Jul. 1, 2003

(54) FORMATTING AND DISPLAYING DATA RETRIEVED FROM A DATABASE

(75) Inventors: Curtis J. Ellmann, Madison, WI (US); John R. Kosic, Carlsbad, CA (US)

(73) Assignee: NCR Corporation, Dayton, OH (US)

( * ) Notice: Subject to any disclaimer, the term of this patent is extended or adjusted under 35 U.S.C. 154(b) by 238 days.

(21) Appl. No.: 09/629,232

(22) Filed: Jul. 31, 2000

(51) Int. Cl.[7] .............................................. G06F 17/30
(52) U.S. Cl. ...................................................... 707/10
(58) Field of Search ............................. 707/10, 103 Y, 707/102, 104.1, 513, 512, 103 R, 103, 103 L

(56) References Cited

U.S. PATENT DOCUMENTS 5,870,549 A * 2/1999 Bobo, II ..................... 709/206
6,173,287 B1 * 1/2001 Eberman et al. ............ 707/102
6,401,094 B1 * 6/2002 Stemp et al. ................. 707/10

* cited by examiner

Primary Examiner—Diane D. Mizrahi
(74) Attorney, Agent, or Firm—John D. Cowart

(57) ABSTRACT

One or more computing systems, such as a database server, a web server, or a client computer, delivers information from a database to a user after receiving an instruction from the user to retrieve the information from the database. The computer retrieves the requested information from the database and applies formatting instructions to text extracted from the requested data. In general, the instructions include terms taken from a selected formatting language, such as HTML or XML. Applying the formatting instructions often involves inserting markup-language tags within the text. The computer then displays the text in a format prescribed by the formatting instructions.

24 Claims, 4 Drawing Sheets

| OBJECT TYPE | EXTENSION |
|---|---|
| AUDIO | .WAV |
| VIDEO2 | .MPG |
| VIDEO1 | .MPG |
| VIDEO | .MPG |
| IMAGE | .JPG |
| CLOB | .TXT |
| TEXT | .TXT |
| GIF | .GIF |

FORMATTING AND DISPLAYING DATA RETRIEVED FROM A DATABASE

BACKGROUND

Many database systems contain very large amounts of data (often exceeding one or even tens of terabytes) stored on multiple disk arrays and managed by multiple computing systems. Database users usually extract information from these systems using some form of database-query language, typically an industry-standard language, such as the Structured Query Language (SQL), standards for which are defined by the American National Standards Institute (ANSI).

A user generally gains access to a database through a client computer networked to the database system. Database software installed in the client computer recognizes database query commands entered by the user and acts upon these commands. Upon receiving a query command from the user, the client software reads and interprets the command and, in response to the command, asks the database system to gather the requested data, extracts the gathered data from the database, and then receives the data at the client computer.

In general, the data retrieved by the user is displayed as text on a display console, usually in a dedicated window in a window-based operating system, such as Unix or Microsoft Windows 9x, 2000, or NT. The display console often shows the text with some rudimentary formatting, such as in the form of a table representing the relational nature of the data in the database.

For a database system that stores object data, such as video, image, and audio files, the client software retrieves metadata describing the objects requested by the user. The display console displays this metadata as text, which usually gives very little useful information about the requested object. To retrieve and actually display the contents of a requested object, the user must type one or more commands that instruct the client software to retrieve the object and launch an appropriate viewer program, such as an image viewer or a sound player. Alternatively, the user must launch the appropriate viewer program manually and then open the requested object from that program.

SUMMARY

Described below are one or more implementations of the invention, including a technique for providing a user-friendly, formatted display of information retrieved from a database, such as the Teradata Object-Relational database system offered by NCR Corporation. The information is displayed in a conventional, well-recognized format, such as Hypertext Markup Language (HTML) or Extensible Markup Language (XML) tables, standards for which are put forth by the World Wide Web Consortium (W3C). This technique also allows quick and easy opening of objects stored in the database, e.g., by storing a copy of the object in the client computer with a file extension indicating the object's file type. The file extension identifies the type of viewer program needed to view the object.

In one approach, the invention involves delivering information from a database to a user after receiving an instruction from the user to retrieve the information from the database. One or more computing systems, such as a database server, a web server, or a client computer, retrieves the requested information from the database and applies formatting instructions to text extracted from the requested data. In general, the instructions include terms taken from a selected formatting language, such as HTML or XML. Applying the formatting instructions often involves inserting markup-language tags within the text. The computer then displays the text in a format prescribed by the formatting instructions.

In many cases, the computer also displays a hyperlink to an object requested by the user, often using metadata describing the object in creating the hyperlink. Displaying the formatted text and hyperlinks often involves launching a program, such as an off-the-shelf web browser, designed to interpret markup-language tags and format the text accordingly.

Other features and advantages will become apparent from the description and claims that follow.

DETAILED DESCRIPTION

Figure 1:
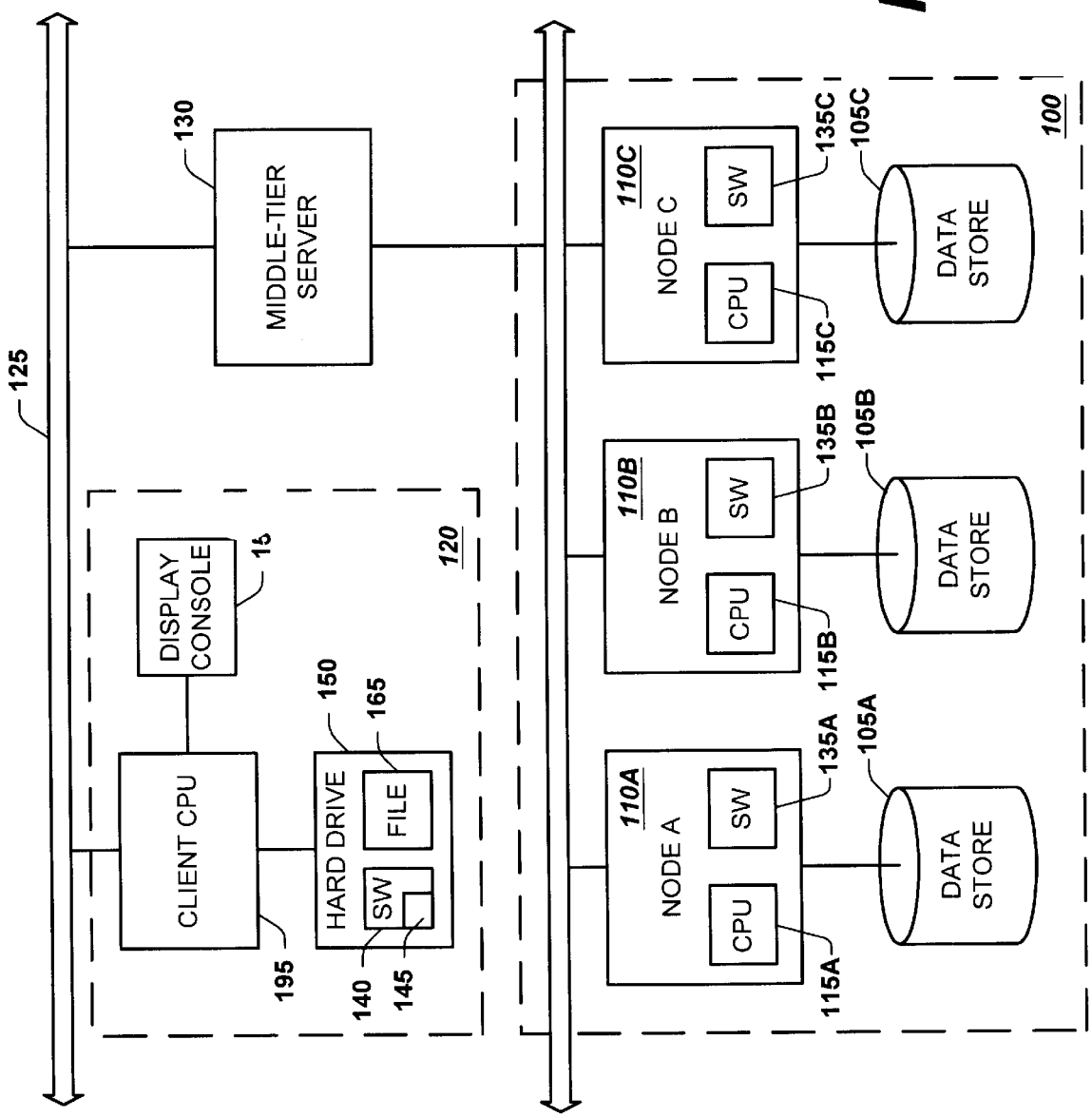
FIG. 1 is a schematic diagram of a network including a database system and a client computer.

FIG. 1 shows a database system 100, such as a Feradata Object-Relational database system offered by NCR Corporation, which stores massive amounts of data in a series of data stores 105A-C, such as parallel disk arrays. One or more parallel computing systems 110A-C, or nodes, each with one or more CPUs 115A-C (central processing units, or processors), manage the flow of data into and out of the data stores 105A-C. The computing systems 110A-C also manage the organization of the data in the data stores 105A-C. The types of data that might be stored in the database system 100 include standard data types, such as binary strings, character strings, and date and time, as well as data objects, such as video and audio clips, formatted text documents, and geospatial data.

A user of the database system 100 accesses the information in the database through a client computing system 120 that connects to the database system 100 through a network 125. In some embodiments, the network 125 includes one or more middle-tier server computers 130, such as a web server, that direct the flow of information between the client computer 120 and the database.

Server-side software programs 135A-C in the nodes 110A-C of the database system 100 allow the client computer 120 to access the database. Corresponding client-side software 140 in the client system 120 allows the user to request and view information from the database. In general, the client-side software 140 includes a command-line interface program 145 that, when executed by the client CPU 195, allows the user to enter database-query and database-management instructions, typically in the form of SQL (Structured Query Language) commands. The client software 140 retrieves the data requested by the user and then stores the data locally (e.g., to a hard disk 150, floppy disk, or CD-ROM), displays the data on a display console 155, or both.

Figure 2:
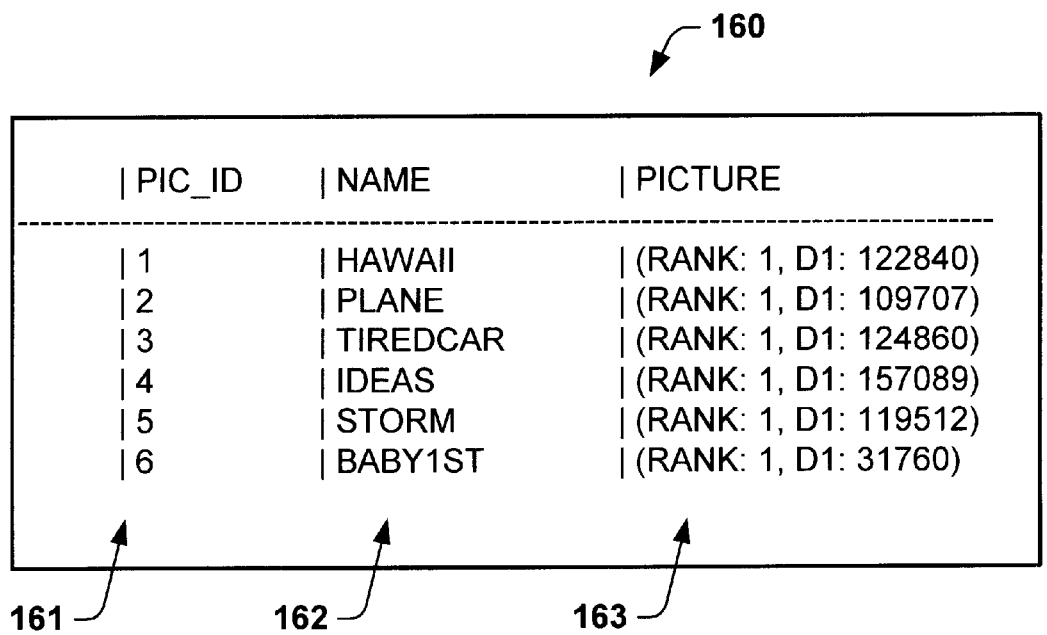
FIG. 2 is a textual display of information retrieved from the database by a conventional client software program and presented in a standard row-column format.

FIG. 2 shows a traditional textual display 160 created from information retrieved from the database system using a conventional client-side software program. This type of text display is common even when the data requested includes object data, such as a JPEG or ".gif" image, an MPEG video clip, or a ".wav" audio file. When objects are retrieved from the database, the text that appears on the console is derived from metadata describing those objects. The objects themselves are not susceptible to display in the traditional row-column format that is common with relational databases.

In the example of FIG. 2, the user has requested six rows of data from the database, each including a data object of the "GIF" (image) data type. The display includes three fields per row: (1) an identification number 161, (2) a name assigned to the image 162, and (3) a metadata code identifying the location of the image in the database 163. To view one of the images, the user must launch a program that exports the image data from the database to a file in the client computer. The user must then interpret the exported data to identify the appropriate viewer program, launch the viewer program, and open the file in the viewer program.

Figures 3, 4:
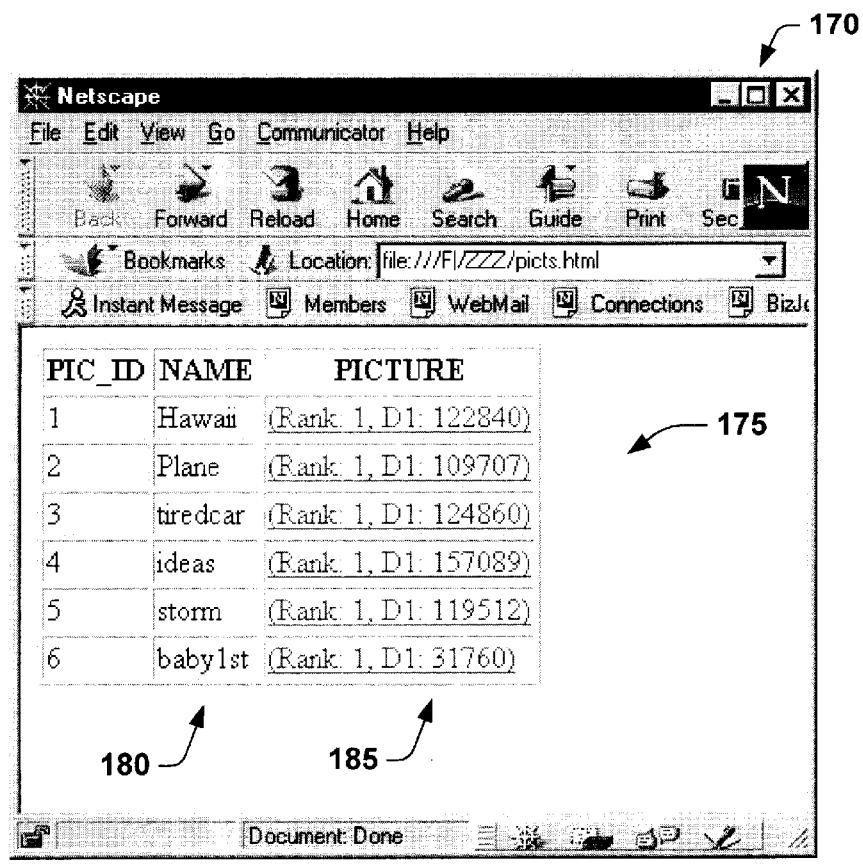
FIG. 3 is a view of database information displayed in an HTML table, including hyperlinks to objects retrieved from the database.
FIG. 4 is a look-up table showing file extensions associated with certain types of objects stored in the database.

FIG. 3 is an example of a formatted display 170 created by the improved client-side software 140 of FIG. 1 upon retrieving the same six images requested in the example of FIG. 2. The client software creates a formatted table 175 that includes information describing the images, such as the name 180 given to each image and the metadata code 185 identifying the location of the image in the database system. The client software displays this information in a specialized format that allows the user to identify and view the images quickly and with minimal effort. In many embodiments, the data is displayed as an HTML table using a standard, off-the-shelf viewer program, such as the Netscape Navigator web browser (shown here) or Microsoft Internet Explorer web browser. As described below, the client software adds formatting codes, such as HTML tags, to the data after retrieving it from the database. Formatting the requested data in this manner produces a visual display that the user more quickly and fully understands and thus can act on more readily.

The client software also creates, for each requested object, a direct link between the information on the display and a file 165 (FIG. 1) containing the object data. The file is usually stored to a hard disk, a floppy disk, a memory module, or another storage device in the client computer system. In the example of FIG. 3, the metadata code 185 for each image is used to form a hypertext link to the file. The user views the object simply by selecting the hypertext link in the display.

When creating a file name for the local copy of the object, the client software includes a file-type extension that identifies the object's file type. This file-type extension instructs the client computer to launch an appropriate viewer program when the user selects the link to one of the object files. For example, if the object is a JPEG image file, which has an "IMAGE" data type in the database system, the client software includes the file-type extension ".jpg" in the file name of the local copy of the image. The user of the client software controls the mapping from data type to file type, e.g., through a "SET EXPORTFILEEXTENSION" command. For example, to assign a ".avi" file-type extension to a "VIDEO1" data type, the user might enter the following command in the command-line interface:

SET EXPORTFILEEXTENSION VIDEO1 AVI

When the user selects the link to an image file in the display 170, the client computer automatically launches an image-viewer program and displays the selected image through this program. Alternatively, the client software might display the selected image directly in the web-browser window. Likewise, if the user requests a WAV audio file, which has an "AUDIO" data type in the database system, the client software includes the file-type extension ".wav" in the file name of the local copy of the object.

FIG. 4 shows an example look-up table 190, used by the client software in creating local copies of requested objects, that lists the names of the data types stored in the database system and the file-type extensions mapped to those labels. In many cases, a user will modify the look-up table 190 to add object types that are newly developed or newly supported by the database.

Figure 5:
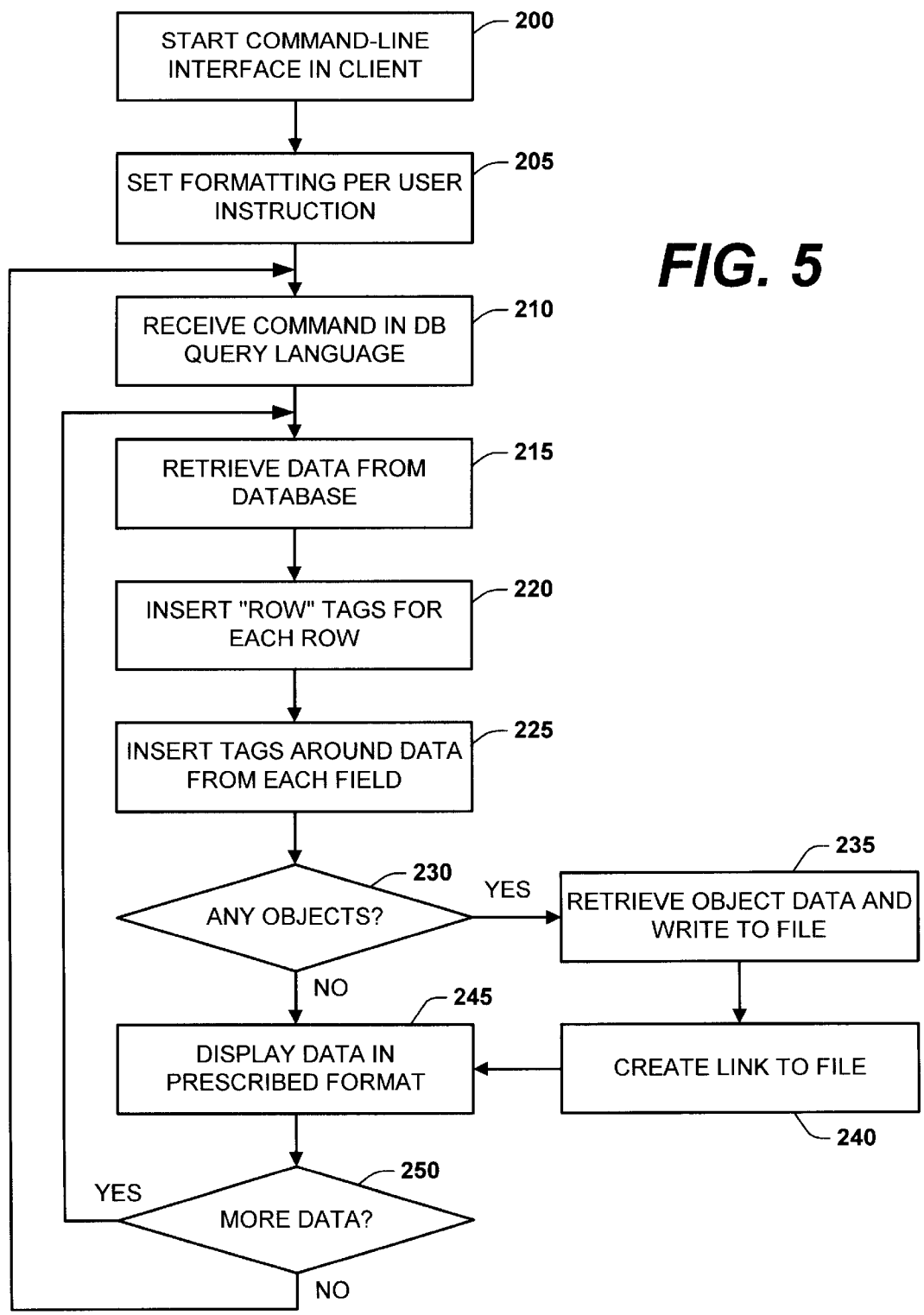
FIG. 5 is a flow chart of a technique for use retrieving data from a database and formatting some of that data for display on a display console.

FIG. 5 is one example of a flow chart for the operation of the client-side software in retrieving data from the database and creating a formatted display of that data. The client software first launches an interface program, such as a Unix-based command-line interface, that allows the user to enter database-query commands (step 200). The software then receives a formatting instruction from the user, such as the command-line instruction "SET REPORTFORMAT HTML," which instructs the client software to display the query results in an HTML table (step 205). The software also receives a database-query command from the user, typically in a standard query language such as the Structured Query Language (SQL) (step 210). The client computer then delivers the database-query instruction to the database system and retrieves the requested data (step 215).

Upon receiving the requested data from the database system, the client software inserts delimiting tags around each row of data (step 220) and around each field of data within the rows (step 225). When the user requests HTML formatting, the tags inserted are HTML tags. The client software then determines whether the user has requested any object data from the database system (step 230). If so, the client retrieves a copy of each requested object and stores the object data to a file in a local storage device, such as a hard disk, floppy disk, or memory module in the client computer system (step 235). In creating the local copy of the object, the client software creates a file name that includes an appropriate file-type extension, as described above.

The client software also creates a direct link, such as a hypertext link, to the file containing the object data (step 240). For HTML formatting, the client receives metadata describing the object from one of the rows in the database and places this metadata in the hypertext link. The client software then displays the formatted data on the display console (step 245). The user views the requested object data by selecting the link in the display, such as by clicking on the metadata text with a mouse or other input device.

After adding each piece of requested information to the formatted display, the client software determines whether it has retrieved all of the requested data (step 250). If not, the client retrieves more data from the database (step 215), formats this data (steps 220 and 225), and adds the data to the display (step 240). Otherwise, the client waits for the user to enter another database-query command (step 210).

Computer-based and other implementations

Many implementations of the invention are realized in electronic hardware, computer software, or a combination of these technologies. Most implementations include one or more computer programs executed by a programmable computer. In general, the computer includes one or more processors, one or more data-storage components (e.g., volatile and nonvolatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

The text above describes one or more specific embodiments of the broader invention. The invention also is carried out in a variety of alternative embodiments and thus is not limited to those described here. Therefore, other embodiments are within the scope of the following claims.

What is claimed is:

1. A method for use in delivering information from a database system to a user of a client computer system, the method comprising:
   receiving from the user one or more instructions to retrieve information from the database and to present at least some of the information in a format selected by the user;
   retrieving the requested information from the database;
   in the client computer, applying formatting instructions to text extracted from the requested information, where the instructions include terms taken from a formatting language that is consistent with the format selected by the user; and
   displaying the text in the format prescribed by the formatting instructions.

2. The method of claim 1, further comprising displaying a hyperlink to an object requested by the user.

3. The method of claim 2, where displaying the hyperlink includes displaying metadata describing the object.

4. The method of claim 1, where applying formatting instructions includes inserting markup-language tags within the text.

5. The method of claim 4, where inserting markup-language tags includes inserting hypertext markup language (HTML) tags within the text.

6. The method of claim 4, where inserting markup-language tags includes inserting extensible markup language (XML) tags within the text.

7. The method of claim 4, where displaying the text includes launching a program designed to interpret the markup-language tags and format the text accordingly.

8. The method of claim 7, where launching the program includes launching an off-the-shelf web browser.

9. The method of claim 1, where retrieving the requested information includes storing a copy of a requested object.

10. The method of claim 9, where storing the copy of the requested object includes creating a file name that indicates the object's type.

11. A computer program, stored on a tangible storage medium, for use in delivering information from a database to a user of a client computer, the program comprising executable instructions that, when executed by the client computer, cause the computer to:
   receive from the user one or more instructions to retrieve information from the database and to present at least some of the information in a format selected by the user;
   retrieve the requested information from the database;
   apply formatting instructions to text extracted from the requested information, where the instructions include terms taken from a formatting language that is consistent with the format selected by the user; and display the text in the format prescribed by the formatting instructions.

12. The program of claim 11, where the computer also displays a hyperlink to an object requested by the user.

13. The program of claim 12, where, in displaying the hyperlink, the computer displays metadata describing the object.

14. The program of claim 11, where, in applying the formatting instructions, the computer inserts markup-language tags within the text.

15. The program of claim 14, where, in inserting markup-language tags, the computer inserts hypertext markup language (HTML) tags within the text.

16. The program of claim 14, where, in inserting markup-language tags, the computer inserts extensible markup language (XML) tags within the text.

17. The program of claim 14, where, in displaying the text, the computer launches a program designed to interpret the markup-language tags and format the text accordingly.

18. The program of claim 17, where, in launching the program, the computer launches an off-the-shelf web browser.

19. The program of claim 11, where, in retrieving the requested information, the computer stores a copy of a requested object.

20. The program of claim 19, where, in storing the copy of the requested object, the computer creates a file name that indicates the object's type.

21. A network comprising:
   a database system having:
      data stored in one or more storage devices; and
      one or more computing systems configured to manage the data in the storage devices;
   a client computing system configured to give a user access to the data in the database system; and
   a computer program, stored on a tangible storage medium, that causes the client computing system to:
      receive from the user one or more instructions to retrieve data from the database system and to present at least some of the data in a format selected by the user;
      retrieve the requested data from the database system;
      apply formatting instructions to text extracted from the requested data, where the instructions include terms taken from a formatting language that is consistent with the format selected by the user; and
      display the text in the format prescribed by the formatting instructions.

22. The system of claim 21, where one or more of the computing systems also displays a hyperlink to an object requested by the user.

23. The system of claim 22, where, in displaying the hyperlink, the computing system displays metadata describing the object.

24. The system of claim 21, where, in applying the formatting instructions, the computing system inserts markup-language tags within the text.

* * * * *